United States Patent
Reller et al.

(10) Patent No.: US 11,878,807 B2
(45) Date of Patent: Jan. 23, 2024

(54) ADAPTIVE AIR FLOW INHIBITOR SEAL FOR AIRCRAFT PROPULSION SYSTEMS

(71) Applicant: Raytheon Company, Waltham, MA (US)

(72) Inventors: Dan L. Reller, Vail, AZ (US); Nicholas F. Collison, Tucson, AZ (US); Paul T. Hudak, Vail, AZ (US)

(73) Assignee: Raytheon Company, Tewksbury, MA (US)

( * ) Notice: Subject to any disclaimer, the term of this patent is extended or adjusted under 35 U.S.C. 154(b) by 256 days.

(21) Appl. No.: 16/869,028

(22) Filed: May 7, 2020

(65) Prior Publication Data

US 2021/0347493 A1    Nov. 11, 2021

(51) Int. Cl.
*B64D 29/04* (2006.01)
*F16J 15/32* (2016.01)
*F16J 15/02* (2006.01)

(52) U.S. Cl.
CPC ............ *B64D 29/04* (2013.01); *F16J 15/025* (2013.01); *F16J 15/32* (2013.01)

(58) Field of Classification Search
CPC ................................ F16J 15/32; F16J 15/025
See application file for complete search history.

(56) References Cited

U.S. PATENT DOCUMENTS

| | | | | |
|---|---|---|---|---|
| 3,576,328 | A | | 4/1971 | Vose |
| 5,657,998 | A | * | 8/1997 | Dinc ...................... F16J 15/121 |
| | | | | 277/653 |
| 5,865,597 | A | * | 2/1999 | Ozawa ..................... F16J 15/42 |
| | | | | 415/113 |
| 5,881,799 | A | * | 3/1999 | Kozacka ............... F28D 19/047 |
| | | | | 165/DIG. 21 |
| 5,975,538 | A | * | 11/1999 | Krause ................... F16J 15/322 |
| | | | | 277/584 |
| 6,547,257 | B2 | * | 4/2003 | Cromer ................ F16J 15/3288 |
| | | | | 415/230 |
| 6,599,089 | B2 | * | 7/2003 | Aksit ........................ F02C 7/28 |
| | | | | 415/209.2 |

(Continued)

OTHER PUBLICATIONS

International Search Report and Written Opinion dated Oct. 26, 2021 in corresponding International Application No. PCT/US2020/065223.

*Primary Examiner* — Eugene G Byrd
*Assistant Examiner* — L. Susmitha Koneru
(74) *Attorney, Agent, or Firm* — Renner, Otto, Boisselle & Sklar LLP (57) ABSTRACT

A highly adaptive seal for use in advanced aircraft propulsion and missile systems is provided. The seal is capable of effectively limiting invasive thermal energy and corrosive airflow from entering the internal systems and hardware of the aircraft by managing and controlling the incoming air flow. The seal is configured to be disposed between component parts of the aircraft and create a tortuous path for air flow. The seal maintains contact with the component parts between which it seals by allowing for significant radial and axial displacement freedom of the component parts. Accordingly, hot gas intrusion may be limited in a wide variety of dynamic environments and component displacement conditions. Limiting such hot gas intrusion has a substantial impact on component survivability over the course of free flight of an aircraft.

11 Claims, 6 Drawing Sheets

(56) References Cited

U.S. PATENT DOCUMENTS

| | | | |
|---|---|---|---|
| 6,609,885 B2* | 8/2003 | Mohammed-Fakir | ............... F01D 9/041 415/209.2 |
| 6,637,751 B2* | 10/2003 | Aksit | ............... F01D 9/041 277/653 |
| 7,506,839 B2 | 3/2009 | Conner | |
| 9,115,585 B2* | 8/2015 | Melton | ............... F01D 9/023 |
| 9,206,904 B2* | 12/2015 | Lee | ............... F16J 15/3292 |
| 2002/0163134 A1* | 11/2002 | Cromer | ............... F01D 9/023 277/411 |
| 2003/0123982 A1* | 7/2003 | Aksit | ............... F02C 7/28 415/209.2 |
| 2004/0169339 A1* | 9/2004 | Bock | ............... F16J 15/3216 277/549 |
| 2008/0122183 A1 | 5/2008 | Braun et al. | |
| 2008/0315530 A1* | 12/2008 | vom Schemm | ...... F16J 15/3224 277/549 |
| 2017/0096940 A1 | 4/2017 | Brice | |
| 2018/0051629 A1 | 2/2018 | Teixeira | |
| 2018/0187783 A1* | 7/2018 | McBride | ............ F16J 15/3216 |

* cited by examiner

ADAPTIVE AIR FLOW INHIBITOR SEAL FOR AIRCRAFT PROPULSION SYSTEMS

GOVERNMENT LICENSE RIGHTS

This invention was made with Government support under contract number HR0011-17-C-0025, awarded by the Department of Defense. The Government has certain rights in the invention.

TECHNICAL FIELD

The present invention relates generally to aircraft and missile propulsion systems and more particularly to seals between interfacing components in aircraft and missile propulsion systems.

BACKGROUND

Aircraft and missile propulsion systems often involve highly dynamic environments in which limiting highly invasive thermal energy and corrosive airflow is necessary to protect internal cabin systems and hardware within the aircraft. In highly dynamic environments, large asymmetric radial and axial displacements can occur between aircraft components, such as engine nozzles that are free floating from airframe primary structure, as a result of large thermal and dynamic loading. As a result of these displacements, highly invasive thermal energy and corrosive airflow may enter internal cabin systems and negatively impact internal hardware survivability over time. Hypersonic missile systems, for example, are especially sensitive to hot gas intrusion. Traditional sealing methods, such as conventional o-ring or packing seals, are not effective to inhibit thermal energy or corrosive airflow in highly dynamic environments where significant asymmetric radial and axial displacements may occur on critical aircraft components.

SUMMARY

In a general embodiment, a seal for sealing in between components in an aircraft propulsion system may include two layers. Each layer of the seal may include a flat portion and a plurality of independently flexible segments. The independently flexible segments of each layer may be circumferentially offset such that respective spaces between the segments of the first layer and spaces between the segments of the second layer are offset from each other. In this way, the seal creates a non-direct or tortuous path for airflow therethrough. The seal may be paired with an insulating member disposed axially adjacent the seal between the components in the aircraft propulsion system. The insulating member may provide an additional cooling effect on any air that may pass through the seal into an internal space of the aircraft from an external environment.

According to an aspect of the invention, a seal for sealing in between components in an aircraft propulsion system is provided. The seal includes a flat portion extending circumferentially around a longitudinal axis of the seal and a plurality of independently flexible segments arranged circumferentially around the longitudinal axis and extending obliquely from the flat portion toward the longitudinal axis.

According to an embodiment of any paragraph(s) of this summary, each of the plurality of independently flexible segments have a flanged portion at an end distal from the flat portion.

According to another embodiment of any paragraph(s) of this summary, the flat portion and the plurality of flexible segments are a first flat portion and a first plurality of flexible segments, respectively, of a first layer of the seal. The seal further includes second layer axially adjacent to the first layer. The second layer includes a second flat portion extending circumferentially around the longitudinal axis and a second plurality of independently flexible segments arranged circumferentially around the longitudinal axis and extending obliquely from the second flat portion toward the longitudinal axis.

According to another embodiment of any paragraph(s) of this summary, the first plurality of flexible segments and the second plurality of flexible segments are circumferentially offset relative to each other.

According to another aspect of the invention, an annular sealing system for sealing in between components in an aircraft propulsion system is provided. The annular sealing system includes an annular seal comprising a flat annular portion extending circumferentially around a longitudinal axis of the flat annular portion and a plurality of independently flexible segments arranged circumferentially around the longitudinal axis and extending obliquely from the flat annular portion toward the longitudinal axis. The annular sealing system further includes an insulating member axially adjacent to the annular seal, the insulating member extending circumferentially around the longitudinal axis.

According to an embodiment of any paragraph(s) of this summary, the insulating member has an L-shape or J-Shape.

According to another embodiment of any paragraph(s) of this summary, each of the plurality of independently flexible segments of the annular seal have a flanged portion at an end distal from the flat annular portion.

According to another embodiment of any paragraph(s) of this summary, the insulating member abuts the flat annular portion of the annular seal.

According to another embodiment of any paragraph(s) of this summary, the flat annular portion and the plurality of flexible segments are a first flat annular portion and a first plurality of flexible segments, respectively, of a first layer of the annular seal. The annular seal further includes a second layer axially adjacent to the first layer. The second layer includes a second flat annular portion extending circumferentially around the longitudinal axis and a second plurality of independently flexible segments arranged circumferentially around the longitudinal axis and extending obliquely from the second flat annular portion toward the longitudinal axis.

According to another embodiment of any paragraph(s) of this summary, the first plurality of flexible segments and the second plurality of flexible segments are circumferentially offset relative to each other.

According to another aspect of the invention, a sealed system at an interface between an engine nozzle and an airframe is provided. The sealed system includes an annular seal comprising a flat annular portion extending circumferentially around a longitudinal axis of the flat annular portion and a plurality of independently flexible segments arranged circumferentially around the longitudinal axis and extending obliquely from the flat annular portion toward the longitudinal axis. The sealed system further includes an engine nozzle having an outer surface and an airframe having an inner surface that is arranged circumferentially around the outer surface of the engine nozzle with a space therebetween. The annular seal is disposed in the space between the outer surface of the engine nozzle and the inner surface of the airframe and wherein the flat annular portion of the annular seal is mounted to the inner surface of the airframe. A distal end of each of the plurality of independently flexible segments from the flat annular portion contacts the outer surface of the engine nozzle. The plurality of independently flexible segments exert a biased force on the outer surface of the engine nozzle such that contact of the distal end of each of the plurality of independently flexible segments with the outer surface of the engine nozzle is maintained upon radial and axial displacement of the outer surface of the engine nozzle.

In an embodiment of any paragraph(s) of this summary, the sealed system further comprises an insulating member arranged axially adjacent to the annular seal in the space between the outer surface of the engine nozzle and the inner surface of the airframe and extending circumferentially around the longitudinal axis.

In another embodiment of any paragraph(s) of this summary, the insulating member has an L-shape or J-shape.

In another embodiment of any paragraph(s) of this summary, each of the plurality of independently flexible segments of the annular seal have a flanged portion at an end distal from the flat annular portion.

In another embodiment of any paragraph(s) of this summary, the insulating member is mounted to the inner surface of the airframe.

In another embodiment of any paragraph(s) of this summary, the insulating member is mounted to the inner surface of the airframe at a same attachment point that the flat annular portion of the annular seal is mounted to the inner surface of the airframe.

In another embodiment of any paragraph(s) of this summary, the flat annular portion and the plurality of flexible segments are a first flat annular portion and a first plurality of flexible segments, respectively, of a first layer of the annular seal. The annular seal further includes a second layer axially adjacent to the first layer. The second layer includes a second flat annular portion extending circumferentially around the longitudinal axis and a second plurality of independently flexible segments arranged circumferentially around the longitudinal axis and extending obliquely from the second flat annular portion toward the longitudinal axis.

In another embodiment of any paragraph(s) of this summary, the first plurality of flexible segments and the second plurality of flexible segments are circumferentially offset relative to each other.

In another aspect of the invention, a method of forming the annular seal is provided. The method includes cutting a first portion of the annular seal to a predetermined shape from a supply material. The method further includes cutting at least one additional portion of the annular seal to the predetermined shape from the supply material. The method then includes arranging the first portion and the at least one additional portion together to form the annular seal.

In an embodiment of any paragraph(s) of this summary, the predetermined shape may be a crescent shape.

In another embodiment of any paragraph(s) of this summary, the method includes installing the first portion and the at least one additional portion in a multi-phase forming die to form an angle at which a plurality of independently flexible segments extend from a flat annular portion of each of the first portion and the at least one additional portion of the annular seal.

According to another aspect of the invention, a method of assembling a sealed system at an interface between an engine nozzle and an airframe of an aircraft propulsion system is provided. The method includes mounting an annular seal to an inner surface of the airframe. The method further includes mounting an insulating member to the inner surface of the airframe. The method further includes assembling the airframe, with the annular seal and insulating member mounted thereto, relative to the engine nozzle such that the annular seal and insulating member contact the outer surface of the engine nozzle to provide a seal in the space between the inner surface of the airframe and the outer surface of the engine nozzle.

In an embodiment of any paragraph(s) of this summary, mounting the annular seal to an inner surface of the airframe includes mounting a flat annular portion of the annular seal to the inner surface of the airframe via attachment points.

In an embodiment of any paragraph(s) of this summary, the attachment points are through holes.

In another embodiment of any paragraph(s) of this summary, mounting the insulating member to the inner surface of the airframe includes mounting the insulating member to the inner surface of the airframe via the same attachment points as the annular seal.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

A highly adaptive seal for use in advanced aircraft propulsion and missile systems is disclosed herein. The seal according to the invention is capable of effectively limiting invasive thermal energy and corrosive airflow from entering the internal systems and hardware of the aircraft by managing and controlling the incoming air flow. The seal is configured to be disposed between component parts of the aircraft, such as between an airframe and an engine nozzle. The seal is configured to create a tortuous path for air flow, thereby limiting the amount that may pass therethrough. The seal maintains contact with the component parts between which it seals by allowing for significant radial and axial displacement freedom of the component parts. Specifically, the seal is able to maintain contact through high deformations of its shape to accommodate the radial and axial displacement. When installed, the shape of the seal is intentionally deformed to a nominal value. The seal is configured to maintain its preloaded value under worse case displacement predictions as the seal is under a minimum prescribed level of stress. Accordingly, hot gas intrusion may be limited in a wide variety of dynamic environments and component displacement conditions. The seal according to the invention is agnostic to the aircraft profile and may be tailored to a variety of shapes to limit hot gas intrusion in a wide variety of missile applications, ranging from SCRAM jets to turbine air breathers. Limiting such hot gas intrusion has a substantial impact on component survivability over the course of free flight of an aircraft.

Figure 1:
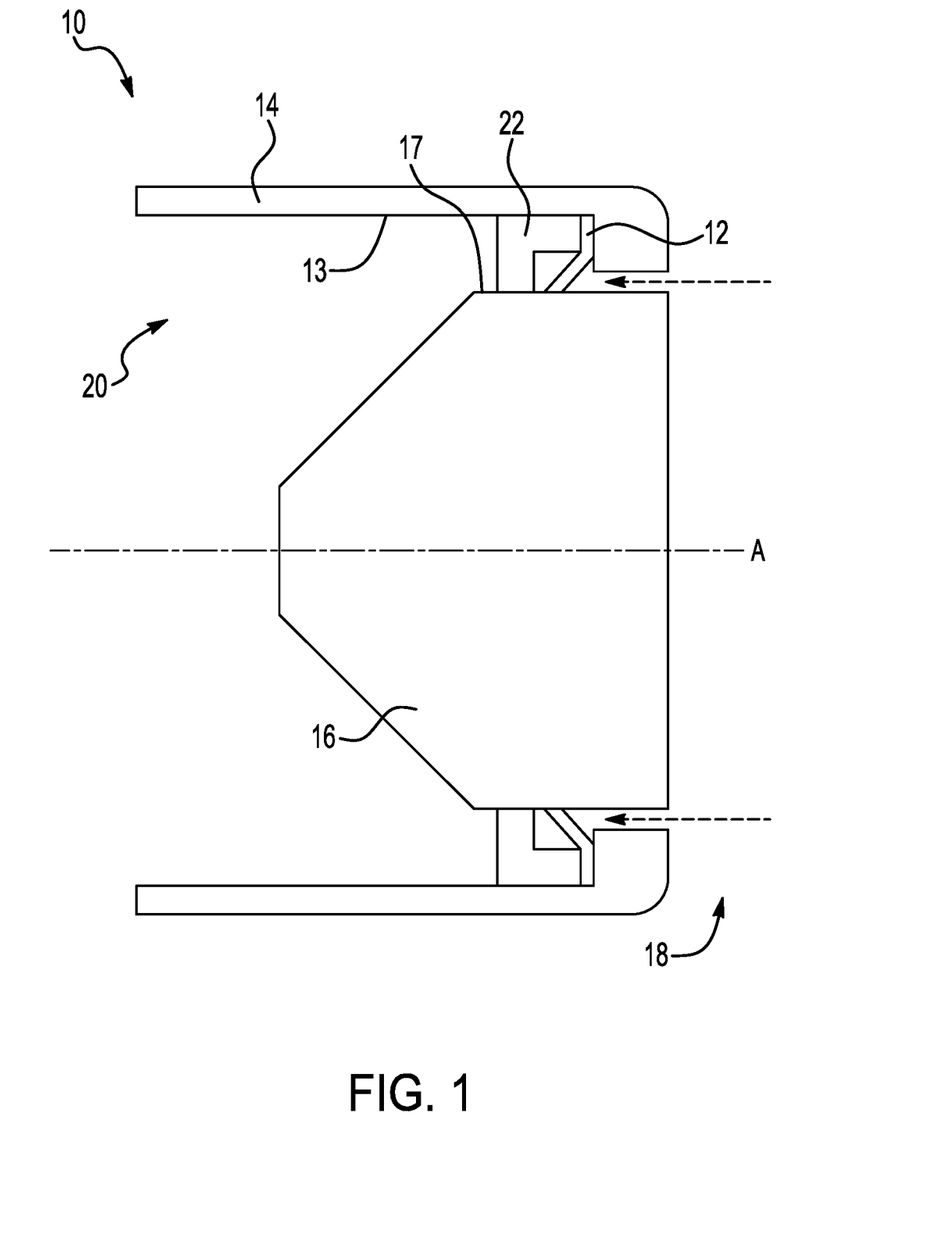
FIG. 1 is a cross-sectional side view of an exemplary sealed system at an interface between an engine nozzle and an airframe.
Figure 2:
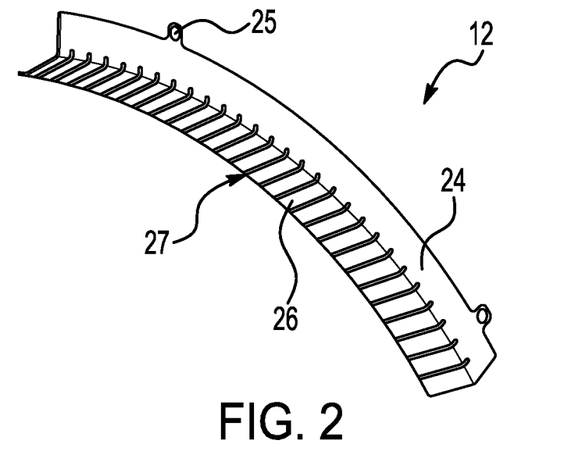
FIG. 2 is an oblique view of a portion of an exemplary annular seal.

Referring now to the figures, and initially to FIG. 1, FIG. 1 depicts an exemplary sealed system 10 at an interface between an engine nozzle 16 and an airframe 14 of an aircraft, for example, a missile. In the illustrated embodiment, the sealed system 10 includes an annular seal 12 disposed in a space between an outer surface 17 of the engine nozzle 16 and an inner surface 13 of the airframe 14, which is arranged circumferentially around the outer surface 17 of the engine nozzle 16. For purposes of description herein, the annular seal 12 will be described for the illustrated embodiment in which the outer surface 17 of the engine nozzle 16 and the inner surface 13 of the airframe 14 circumscribe (e.g., are circumferentially arranged around) a longitudinal axis A of the aircraft. It is appreciated, however, that the outer surface 17 of the engine nozzle 16 and the inner surface of the airframe 14 may have a different geometry around the longitudinal axis A, such as elliptical or polygonal. The term "annular seal," as used herein, will therefore be understood to also refer to these various alternative geometries and may be geometrically tailored accordingly.

The annular seal 12 is configured to be mounted to the airframe 14, with a portion extending toward and contacting the outer surface 17 of the engine nozzle 16. In this way, the annular seal 12 may effectively seal, or close, the space in between the inner surface 13 of the airframe 14 and the outer surface 17 of the engine nozzle 16 to limit invasive thermal energy and corrosive airflow, indicated generally by the dashed arrows, from entering an internal cabin or space 20 of the aircraft from an external environment 18.

Figure 3:
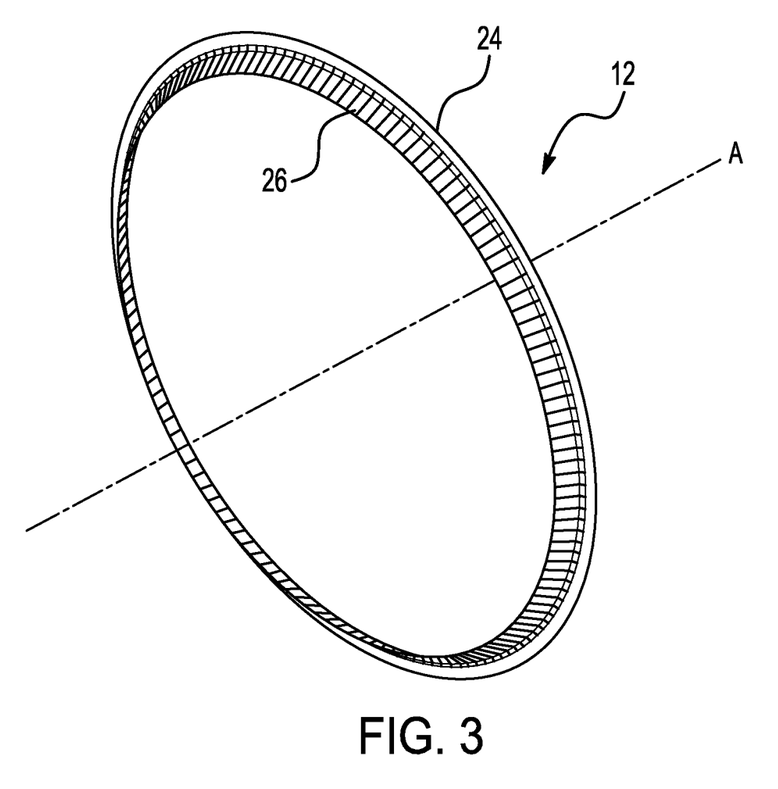
FIG. 3 is an oblique view of the exemplary annular seal.

Turning now to FIGS. 2-5, the annular seal 12 will be described in more detail. As described above, the annular seal 12 will be described as having a circular geometry. However, it is understood that the annular seal may have various other geometries around the longitudinal axis A, such as elliptical or polygonal, depending on the geometries of the outer surface 17 of the engine nozzle 16 and the inner surface 13 of the airframe 14, described above. The annular seal 12 includes a flat annular portion 24 which, in the depicted embodiment, extends circumferentially around the longitudinal axis A (FIG. 3). The flat annular portion 24 is configured to be mounted to the inner surface 14 of the airframe 14. Accordingly, the flat annular portion 24 may include through holes 25 (FIG. 2) or other attachment points for mounting the flat annular portion 24 of the annular seal 12 to the inner surface 13 of the airframe 14 with, for example, screws or bolts.

The annular seal 12, which may be referred to as a "finger seal," includes a plurality of independently flexible segments 26, or "fingers," arranged circumferentially around the longitudinal axis A and extending obliquely from the flat annular portion 24 inwardly toward the longitudinal axis A. The plurality of segments 26 may be separate and distinct from each other, with a space, or aperture 27, between each pair of neighboring segments 26. The size of the aperture 27 between each segment 26 may be tailored to offer electromagnetic interference (EMI) shielding effectiveness of the annular seal 12. Specifically, the size and shape of the aperture 27 may be tailored in order to dampen a specific wavelength or frequency of interest. For example, effective attenuation of unwanted EMI can be achieved by reducing the aperture 27 to less than ½ of the wavelength of the EMI. The aperture 27 characteristics are maintained even through a dynamic deformation range of the annular seal 12 and plurality of independently flexible segments 26.

The material selection, thickness, bend angle and geometry of the annular seal 12, including the flat annular portion 24 and each segment 26, may be tailored to account for component displacement predictions, pressure differentials and various geometrical applications. For example, the material and thickness of the annular seal may be, for example, a stainless-steel alloy such as a 300 series stainless steel alloy and 0.2032 mm. However, the material and thickness of the annular seal 12 will depend on the environment (temperature, pressure differential, expected deformation, and shielding effectiveness) in which it is to be used. For example, in cooler environments, a plastic or polymer annular seal 12 may be used. Other materials may also be suitable. Ultimately, the selection of materials, thickness, and geometry of the annular seal 12 may be tailored, depending on the application to which it is applied.

Figure 4:
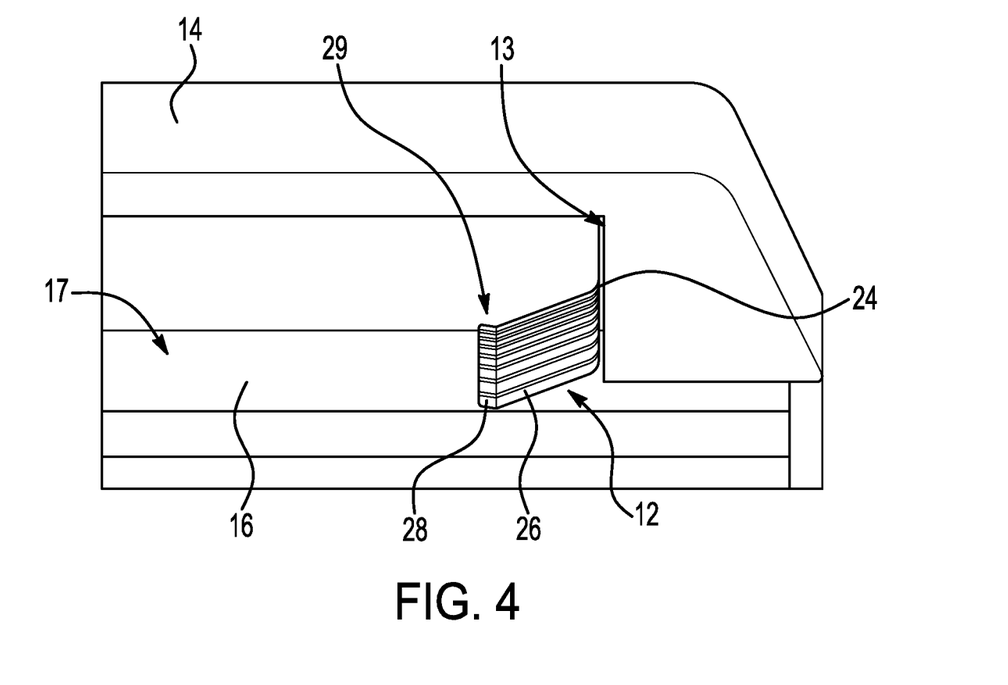
FIG. 4 is a cross-sectional oblique view of the exemplary sealed system.

With reference to FIG. 4, at a distal end 29 of each of the plurality of segments 26 (an end that is distal to the flat annular portion 24), each segment 26 may include a flanged portion 28. The flanged portion 28 may be curved, or may include at least one sharp angle. The flanged portion 28 may be provided such that the surface area of each segment 26 that contacts the outer surface 17 of the engine nozzle 16 and moves across the outer surface 17 of the engine nozzle 16 during displacement, is minimized. In this way, friction between the distal end 29 of each segment 26 and the outer surface 17 of the engine nozzle 16 may be reduced.

Figure 5:
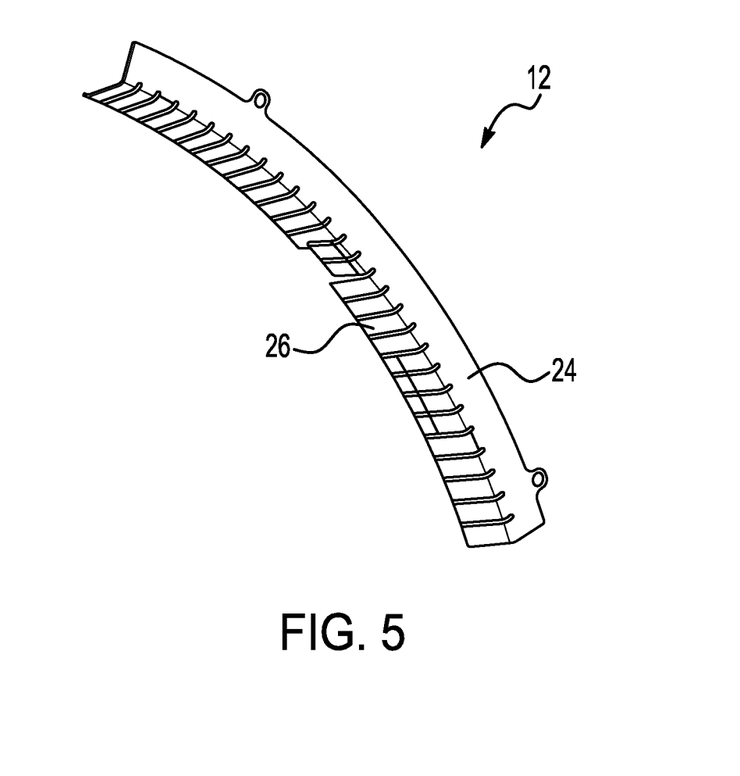
FIG. 5 is an oblique view of a portion of the exemplary annular seal.

When the annular seal 12 is fit between the airframe 14 and the engine nozzle 16, the plurality of independently flexible segments 26 are each configured to exert a loaded force on the outer surface 17 of the engine nozzle 16 such that contact of the distal end 29 of each of the plurality of segments 26 with the outer surface 17 of the engine nozzle 16 is securely maintained. As depicted in FIG. 5, each of the plurality of segments 26 is capable of independently flexing such that an angle from which it extends from the flat annular portion 24 changes. The flexible nature of each of the plurality of segments 26 allows the annular seal 12 to adaptively accommodate varying degrees of radial and axial displacement between the airframe 14 and the engine nozzle 16, while securely maintaining contact of a distal end 29 of each of the plurality of segments 26 with the outer surface 17 of the engine nozzle 16 upon any radial and axial displacement. At a maximum displacement between the airframe 14 and the engine nozzle 16, the plurality of independently flexible segments 26 are configured to maintain a sufficient loaded force on the outer surface 17 of the engine nozzle 16. In this way, the annular seal 12 may effectively maintain the seal between components over the full range of expected pressure and temperature differentials in the highly dynamic environment, thereby limiting thermal energy or corrosive air intrusion where significant axial and radial displacements between the airframe 14 and the engine nozzle 16 may occur.

Figures 6A, 6B, 6C, 7A:
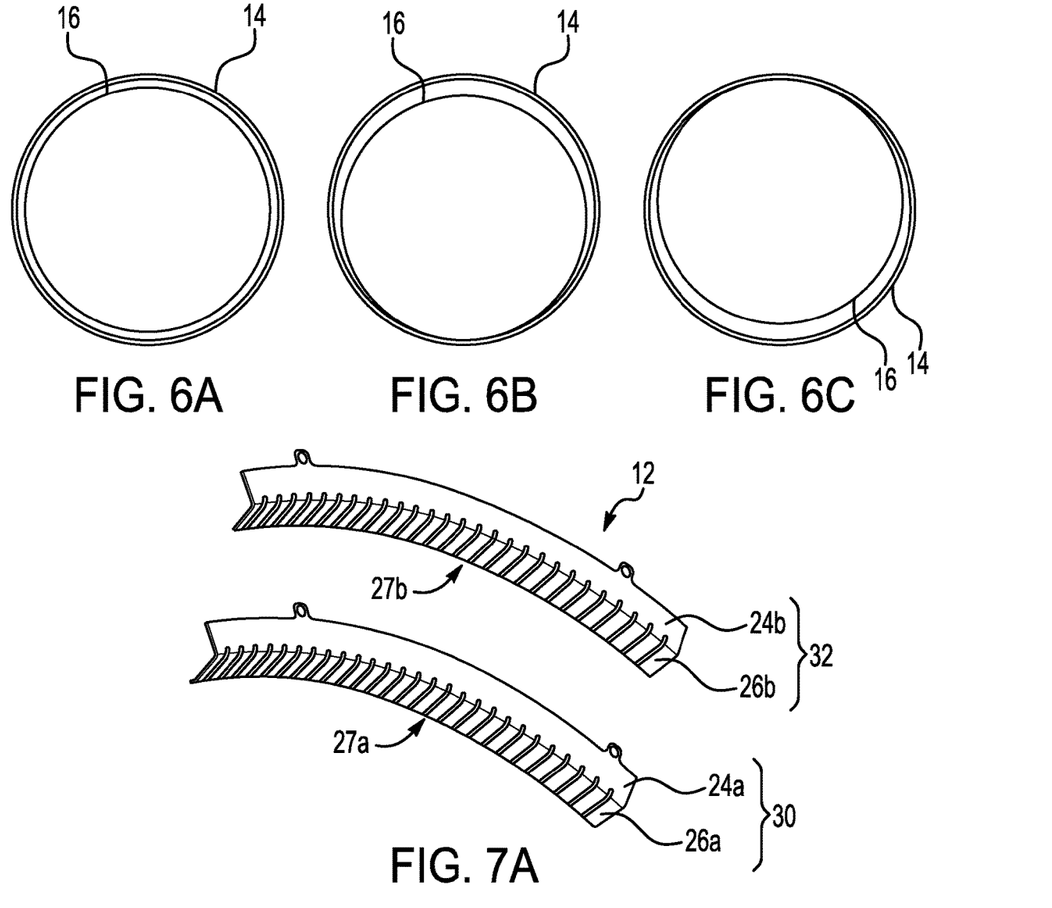
FIGS. 6A-C are cross-sectional views of positional conditions of an engine nozzle and an airframe.
FIGS. 7A-B are oblique views of the exemplary annular seal.

For example, FIGS. 6A-C depict several exemplary conditions in which the annular seal 12 is capable of effectively sealing between the airframe 14 and the engine nozzle 16. FIG. 6A depicts an exemplary normal condition, where the clearance between the engine nozzle 16 and the airframe 14 is consistent along the entire circumference. In this condition, each of the plurality of segments 26 of the annular seal 12, therefore, may all be flexed to the same degree around the circumference of the annular seal 12, each exerting a loaded force on the outer surface 17 of the engine nozzle 16. FIG. 6B depicts an exemplary cruise condition, where the airframe 14 may be distorted due to thermal gradients, while the engine nozzle 16 may be thermally isolated. In this condition, the clearance between the engine nozzle 16 and the airframe 14 may not be consistent around the entire circumference. Accordingly, the plurality of independently flexible segments 26 may be flexed to varying degrees so as to maintain contact between the distal end 29 of each of the plurality of flexible segments 26 and the outer surface of the engine nozzle 16. Finally, FIG. 6C depicts an exemplary terminal condition, where the airframe 14 may be distorted due to thermal gradients and airframe bending, while the engine nozzle 16 is thermally isolated. Again, in this condition, the clearance between the engine nozzle 16 and the airframe 14 may not be consistent around the entire circumference, and the plurality of segments 26 may be flexed to varying degrees as just described with reference to FIG. 6B. Accordingly, in each condition, the annular seal 12 is capable of maintaining the seal between the components.

Figure 7B:
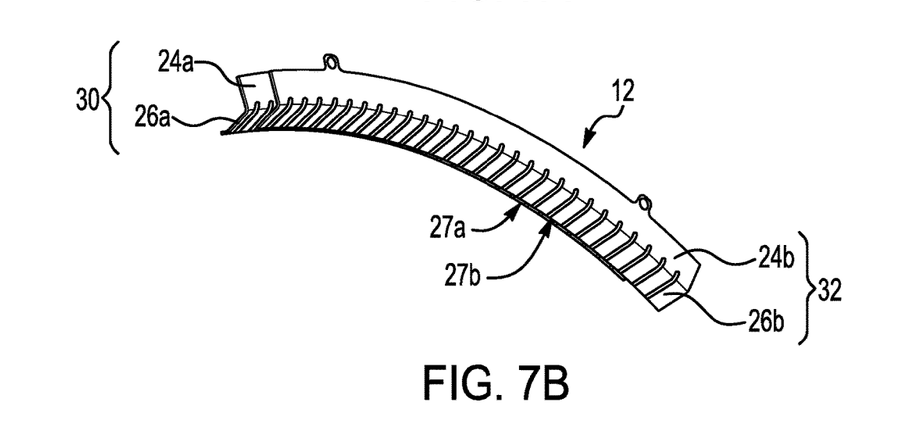

Turning now to FIGS. 7A-B, the annular seal 12 may include more than one seal layer. For example, the flat annular portion 24 and the plurality of independently flexible segments 26 described above may be a first flat annular portion 24a and a first plurality of independently flexible segments 26a, respectively of a first seal layer 30. The annular seal 12 may therefore further include a second seal layer 32 including a second flat annular portion 24b and a second plurality of independently flexible segments 26b. The second seal layer 32 may be configured the same as the first seal layer 30, as described in detail above. Specifically, the second flat annular portion 24b extends circumferentially around the longitudinal axis A and the second plurality of independently flexible segments 26b are arranged circumferentially around the longitudinal axis A and extend obliquely from the second flat annular portion 24b toward the longitudinal axis A.

The second layer 32 overlaps the first layer 30 and is axially aligned with the first layer 30 such that the first layer 30 and the second layer 32 of the annular seal 12 share the same longitudinal axis A. The second layer 32 may be circumferentially offset from the first layer 30 such that the first plurality of flexible segments 26a and the second plurality of flexible segments 26b are circumferentially offset relative to each other. In this embodiment, therefore, apertures 27a between neighboring segments 26a and apertures 27b between neighboring segments 26b are also circumferentially offset relative to each other (i.e., are not axially aligned). In this way, a tortuous axial path for airflow is created to effectively inhibit corrosive airflow intrusion through the first layer 30 and second layer 32 of the annular seal 12.

Figure 8:
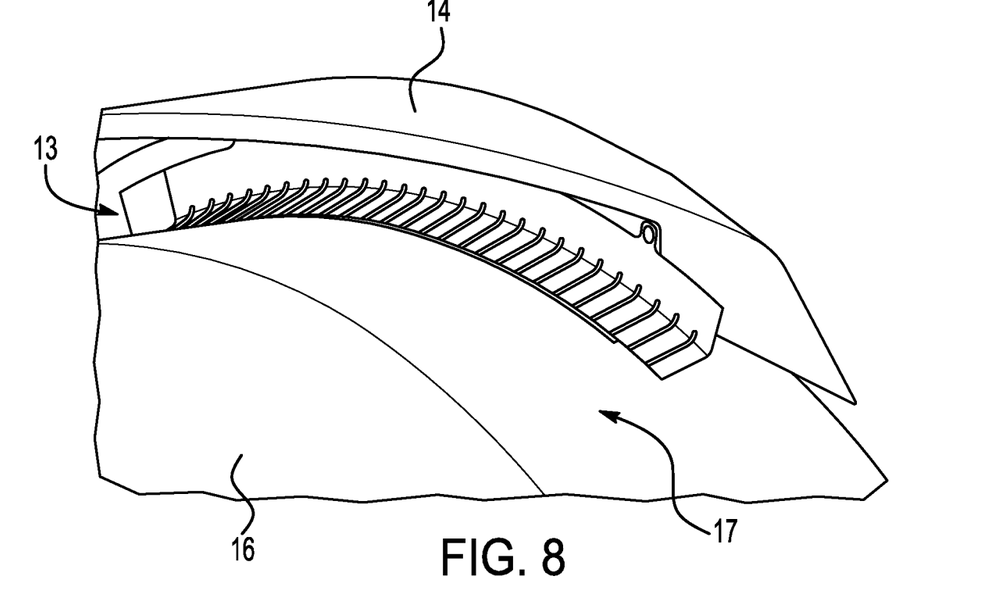
FIG. 8 is a perspective view of the exemplary sealed system.
Figure 9:
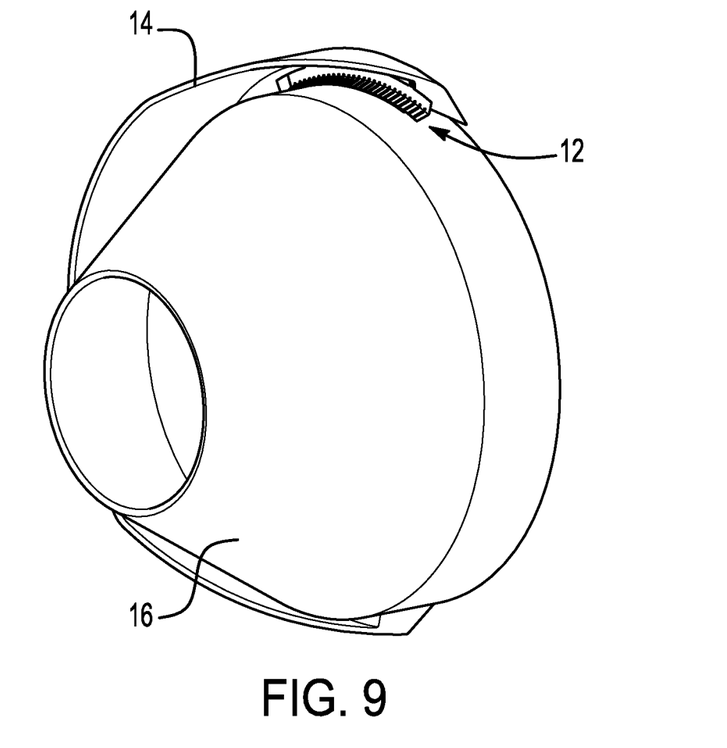
FIG. 9 is another perspective view of the exemplary sealed system.

FIGS. 8 and 9 depict the multiple layer annular seal 12 mounted on the inner surface 13 of the airframe 14 in the space between the inner surface 13 of the airframe 14 and the outer surface 17 of the engine nozzle 16. With additional reference to FIGS. 10 and 11, for additional thermal insulation and inhibition of hot gas intrusion, an insulating member 22 may be provided axially adjacent to the annular seal 12 in the space between the inner surface 13 of the airframe 14 and the outer surface 17 of the engine nozzle 16. The insulating member 22 extends circumferentially around the longitudinal axis A in the same way as the annular seal 12. The insulating member 22 may be mounted to the inner surface 13 of the airframe 14 and therefore may be configured with attachment points (not shown). When mounted to the airframe 14, the attachment points of the insulating member 22 may be aligned with the through holes 25 of the annular seal 12 such that the insulating member 22 and the annular seal 12 may both be mounted to the inner surface 13 of the airframe 14 via common attachment points with common attachment means, such as screws or bolts. As depicted, the insulating member 22 may have a cross-sectional L-shape, or J-shape, such that one leg of the L-shape, or J-shape, may be mounted to the inner surface 13 of the airframe 14, while the other leg of the L-shape, or J-shape, may contact the outer surface 17 of the engine nozzle 16, with the space between the legs accommodating the annular seal 12. The insulating member 22 may be made of a material including ceramic and fiberglass, such as a ceramic cord insulation with fiberglass sheets. The insulating member 22 may be any sort of batted insulation or quilted insulation.

Figure 10:
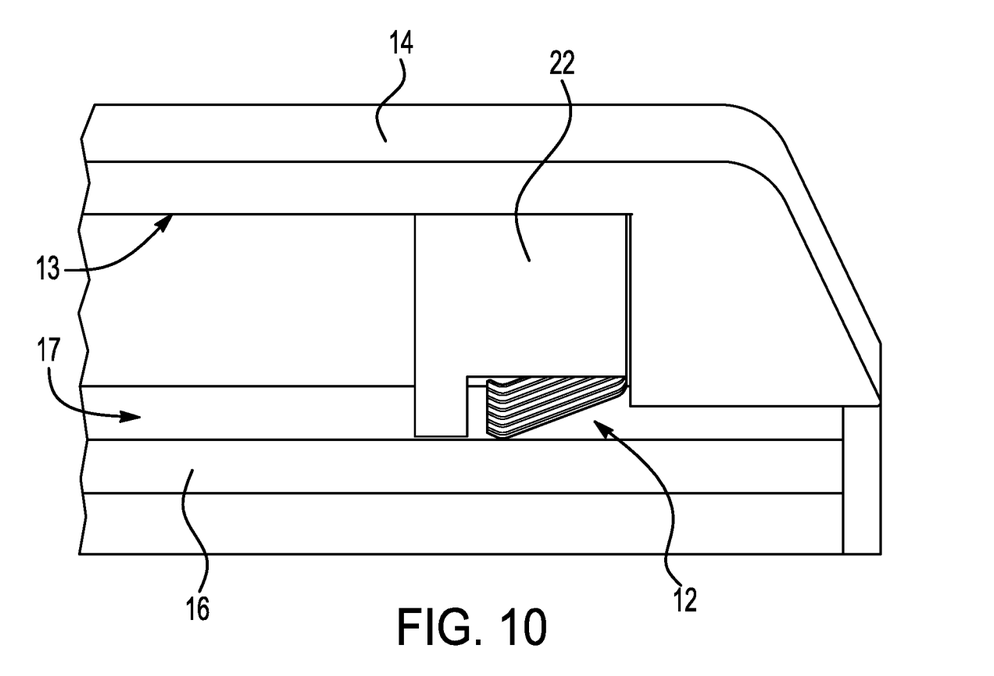
FIG. 10 is a cross-sectional oblique view of the exemplary sealed system.
Figure 11:
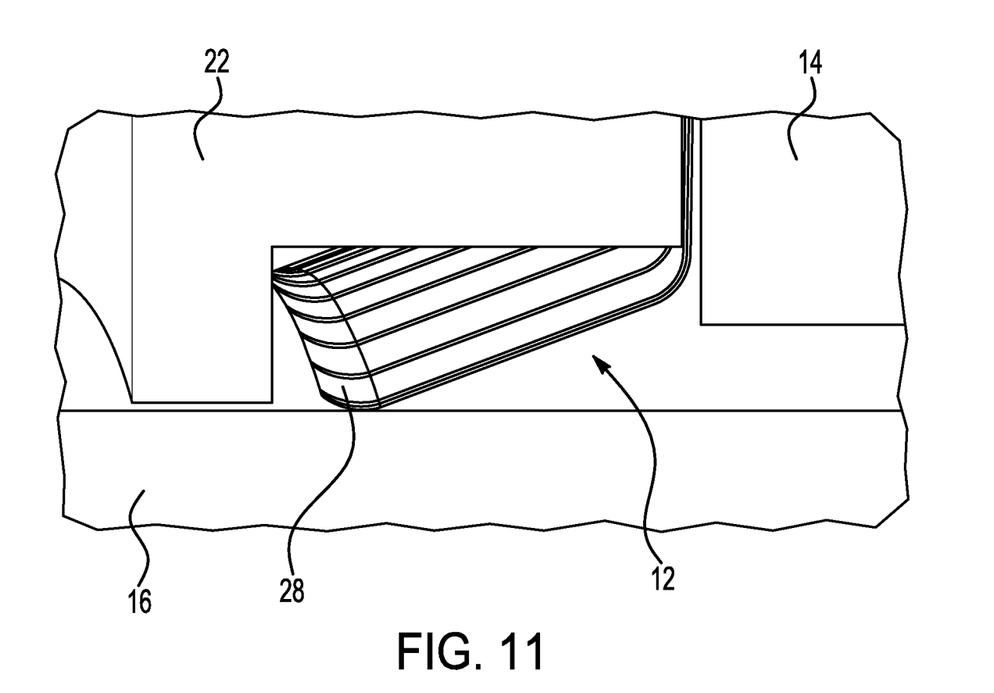
FIG. 11 is another cross-sectional oblique view of the exemplary sealed system.

When the insulating member 22 is coupled with the annular seal 12, any intrusive thermal energy and corrosive airflow that makes its way into the internal cabin 20 from the external environment 18 will first be slowed via the tortuous path created by the annular seal 12, described above, and subsequently will be cooled by the insulating member 22. The negative effects of any intrusive thermal energy and corrosive airflow that enters the internal cabin 20 may therefore be mitigated.

The annular seal 12 may be formed in a piece-part manner, wherein multiple segments or portions are formed individually and subsequently joined together to form the whole annular seal. Traditional methods of manufacturing such as metal brake forming or hydro forming can be employed.

Specifically, a method of forming the annular seal 12 may include cutting a first portion of the annular seal 12 to shape from a supply material. The supply material may depend on the particular environment and application in which the annular seal is to be used, as described above, and may include metal or a polymer. The first portion may be formed in a crescent shape in an embodiment in which the whole annular seal is intended to be circular, as in the embodiments depicted herein. Specifically, flat or crescent shaped patterns can be traditionally machined, laser cut or waterjet for precise dimensional control. All attachment features such as through holes 25 and slots, as well as perimeter shapes and apertures 27 between segments 26, can be pre- or post-forming cut using laser or waterjet. The apertures 27 may be formed by wire electrical discharge machining (EDM). A series of stepped dies can be used to form semi-complex cross sections. In an embodiment in which the annular seal 12 is made of a polymer, traditional methods such as molding or drape forming can be utilized. In either embodiment, in which the annular seal 12 is made of metal or polymer, final shapes can be trimmed after the forming processes or can be completed prior to for a net molded shape at the end.

The method may include cutting at least one additional portion of the annular seal to shape from the supply material in the same way as described above with respect to the first portion. In this way, a plurality of portions of the annular seal 12 may be cut and formed individually before joining the portions together to form the whole annular seal 12. Through these processes, however, it is also possible to form a full annular seal 12 in one piece.

The method may include installing the first portion and the at least one additional portion in a multi-phase forming die to form the angle at which the plurality of independently flexible segments 26 of each portion extend from the flat annular portion 24 of each portion.

The method may include arranging the first portion and the at least one additional portion together to form the whole 360° annular seal. In this step, the first portion and the at least one additional portion may overlap their respective neighboring portions. The overlapping portions may therefore be welded together to join the first portion and the at least one additional portions by, for example, electron beam or laser spot welding techniques.

A method of assembling a sealed system at an interface between an engine nozzle and an airframe may include first mounting the annular seal 12, described in detail above, to the inner surface 13 of the airframe 14. The flat annular portion 24 of the annular seal 12, specifically, may be mounted to the inner surface 13 of the airframe 14 via attachment points such as through holes 25. The method may then include mounting the insulating member 22, described above in detail, to the inner surface 13 of the airframe 14. The insulating member 22 may be mounted to the inner surface 13 of the airframe 14 via the same attachment points, or through holes 25, as the annular seal 12. The method may then include assembling the airframe 14, with the annular seal 12 and insulating member 22 mounted thereto, relative to the engine nozzle 16 such that the annular seal 12 and insulating member 22 contact the outer surface 17 of the engine nozzle 16 to provide a seal in the space between the inner surface 13 of the airframe 14 and the outer surface 17 of the engine nozzle 16.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An annular sealing system comprising:
    an annular seal comprising a flat annular portion extending circumferentially around a longitudinal axis of the flat annular portion and a plurality of independently flexible segments arranged circumferentially around the longitudinal axis and extending obliquely from the flat annular portion toward the longitudinal axis; and
    an L-shape or J-shape insulating member axially adjacent to and distinct from the annular seal, the insulating member extending circumferentially around the longitudinal axis and having an axially extending first leg and a radially extending second leg configured to accommodate at least a part of the annular seal in a space between the axially extending first leg and the radially extending second leg, the insulating member being configured to cool airflow passing therethrough; wherein the axially extending first leg is adjacent and contacting the flat annular portion of the annular seal, and the radially extending second leg is adjacent to the plurality of independently flexible segments of the annular seal.

2. The annular sealing system according to claim 1, wherein each of the plurality of independently flexible segments of the annular seal have a flanged portion at an end distal from the flat annular portion.

3. The annular sealing system according to claim 1, wherein the insulating member abuts the flat annular portion of the annular seal.

4. The annular sealing system according to claim 1, wherein the flat annular portion and the plurality of flexible segments are a first flat annular portion and a first plurality of flexible segments, respectively, of a first layer of the annular seal, the annular seal further comprising a second layer axially adjacent to the first layer, the second layer including:
    a second flat annular portion extending circumferentially around the longitudinal axis; and
    a second plurality of independently flexible segments arranged circumferentially around the longitudinal axis and extending obliquely from the second flat annular portion toward the longitudinal axis.

5. The annular sealing system according to claim 4, wherein the first plurality of flexible segments and the second plurality of flexible segments are circumferentially offset relative to each other.

6. A sealed system comprising:
    an annular seal comprising a flat annular portion extending circumferentially around a longitudinal axis of the flat annular portion and a plurality of independently flexible segments arranged circumferentially around the longitudinal axis and extending obliquely from the flat annular portion toward the longitudinal axis;
    an engine nozzle having an outer circumferential surface;
    an airframe having an inner circumferential surface that is arranged circumferentially around the outer circumferential surface of the engine nozzle with a space therebetween; and
    an L-shape or J-shape insulating member arranged axially adjacent to and distinct from the annular seal in the space between the outer circumferential surface of the engine nozzle and the inner circumferential surface of the airframe and extending circumferentially around the longitudinal axis, the insulating member having an axially extending first leg mounted to the inner circumferential surface of the airframe and a radially extending second leg contacting the outer circumferential surface of the engine nozzle, the axially extending first leg and the radially extending second leg being configured to accommodate at least a part of the annular seal in a space between the axially extending first leg and the radially extending second leg, the insulating member being configured to cool airflow passing therethrough;

wherein the axially extending first leg is adjacent and contacting the flat annular portion of the annular seal, and the radially extending second leg is adjacent to the plurality of independently flexible segments of the annular seal;

wherein the annular seal is disposed in the space between the outer circumferential surface of the engine nozzle and the inner circumferential surface of the airframe and wherein the flat annular portion of the annular seal is mounted to the inner circumferential surface of the airframe;

wherein a distal end of each of the plurality of independently flexible segments from the flat annular portion contacts the outer circumferential surface of the engine nozzle; and wherein the plurality of independently flexible segments exert a biased force on the outer circumferential surface of the engine nozzle such that contact of the distal end of each of the plurality of independently flexible segments with the outer circumferential surface of the engine nozzle is maintained upon radial and axial displacement of the outer circumferential surface of the engine nozzle.

7. The sealed system according to claim 6, wherein each of the plurality of independently flexible segments of the annular seal have a flanged portion at an end distal from the flat annular portion.

8. The sealed system according to claim 6, wherein the insulating member is mounted to the inner circumferential surface of the airframe.

9. The sealed system according to claim 8, wherein the insulating member is mounted to the inner circumferential surface of the airframe at a same attachment point that the flat annular portion of the annular seal is mounted to the inner circumferential surface of the airframe.

10. The sealed system according to claim 6, wherein the flat annular portion and the plurality of flexible segments are a first flat annular portion and a first plurality of flexible segments, respectively, of a first layer of the annular seal, the annular seal further comprising a second layer axially adjacent to the first layer, the second layer including:
 a second flat annular portion extending circumferentially around the longitudinal axis; and
 a second plurality of independently flexible segments arranged circumferentially around the longitudinal axis and extending obliquely from the second flat annular portion toward the longitudinal axis.

11. The sealed system according to claim 10, wherein the first plurality of flexible segments and the second plurality of flexible segments are circumferentially offset relative to each other.

* * * * *

UNITED STATES PATENT AND TRADEMARK OFFICE
CERTIFICATE OF CORRECTION

| | | |
|---|---|---|
| PATENT NO. | : 11,878,807 B2 | Page 1 of 1 |
| APPLICATION NO. | : 16/869028 | |
| DATED | : January 23, 2024 | |
| INVENTOR(S) | : Reller et al. | |

It is certified that error appears in the above-identified patent and that said Letters Patent is hereby corrected as shown below:

In the Specification

In Column 5, Line 60, delete "14" and insert --13-- therefor

Signed and Sealed this
Tenth Day of December, 2024

Katherine Kelly Vidal
*Director of the United States Patent and Trademark Office*